UNITED STATES PATENT OFFICE.

ROBERT A. CHESEBROUGH, OF NEW YORK, N. Y.

MEDICINAL EXTRACT.

SPECIFICATION forming part of Letters Patent No. 469,850, dated March 1, 1892.

Application filed October 28, 1887. Serial No. 253,614. (No specimens.)

*To all whom it may concern:*

Be it known that I, ROBERT A. CHESEBROUGH, of the city and county of New York, in the State of New York, have invented a new and useful Improvement in the Manufacture of Medicinal Extracts, of which the following is a specification.

This invention is based upon the discovery which I have made of a property which exists in that amorphous refined product of petroleum which when in a cold state is known as "petroleum-jelly," and of which vaseline is the best-known example, but of which other examples are known, as petrolatum and cosmoline, such property consisting in its capacity for extracting a very large proportion of the active medicinal principles or ingredients of vegetable substances, and thereby obtaining very highly-concentrated medicinal extracts of such substances.

The invention consists in a medicinal extract composed of an amorphous refined product of petroleum known as "petroleum-jelly" combined and compounded with the active principle of a vegetable by and through the direct extraction of such principle from the vegetable.

This extract may be obtained by infusion or by causing the said petroleum-jelly to percolate through the vegetable substances at a temperature sufficiently elevated to insure its free fluidity. The process is generally performed in a filter or percolating-vessel containing a porous or reticulated or perforated bed or diaphragm, on which the vegetable substances from which extracts are to be made are placed in a layer or body of convenient thickness. These substances, which may be seeds, leaves, bark, fibers, wooden chips, or any portions of trees or plants, may be treated whole, or may be ground, cut up, or otherwise divided, as may be most desirable, to facilitate the extraction of their active medicinal principles or ingredients, and the vessel may be heated in any suitable manner to maintain them at such a temperature—say from 120° to 140° Fahrenheit—as will render perfectly fluid the amorphous refined petroleum product, preferably vaseline, which is supplied above the said layer or body and allowed to percolate through it in such a manner as to carry with it the matter extracted.

Among the vegetable substances from which the extract may be obtained I will mention mustard, cloves, coffee, cinnamon, coca, bay-leaves, pimento, red pepper, celery seeds, stalks, and leaves, ginger, hops, arnica, cinchona bark, boneset, thyme, and mint; but I will state generally that it may be obtained from all vegetable substances the active medicinal principles or ingredients of which are soluble in or capable of being absorbed by the refined products of petroleum.

The infusion instead of being effected by percolation, as described, may be effected by steeping the vegetable substances in the amorphous petroleum product herein described, while the latter is maintained at a proper temperature to insure its free fluidity, and afterward straining or filtering.

What I claim as my invention, and desire to secure by Letters Patent, is—

The herein-described extract, composed of petroleum-jelly, combined and compounded with the active principle of a vegetable by and through the direct extraction of such principle from the vegetable, substantially as set forth.

ROBT. A. CHESEBROUGH.

Witnesses:
S. H. McFADDEN,
F. G. TELFER.